July 8, 1958 P. CIGNOLINI 2,842,671
ROENTGENPOLYCHIMOGRAPHIC METHOD, APPARATUS THEREFOR
AND ROENTGENPOLYKYMOGRAPH OBTAINABLE THEREBY
Filed Dec. 28, 1953
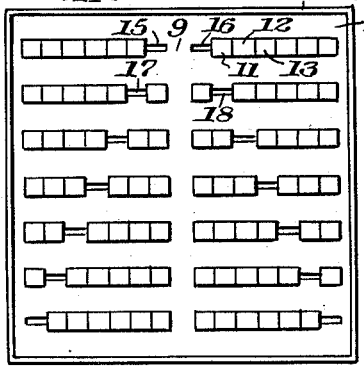
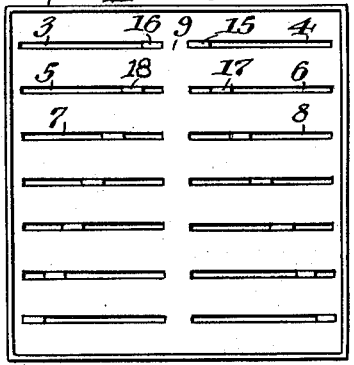
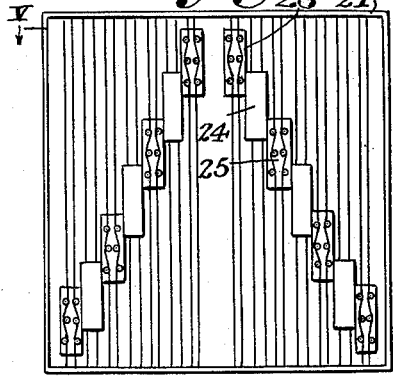
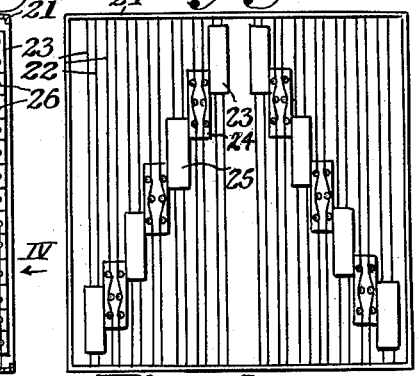
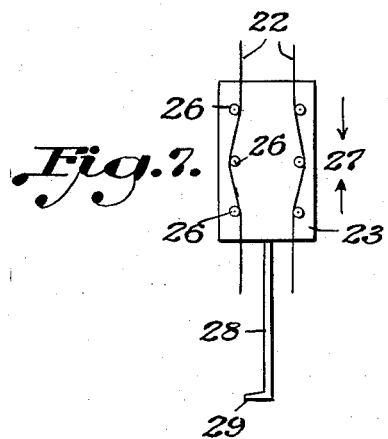
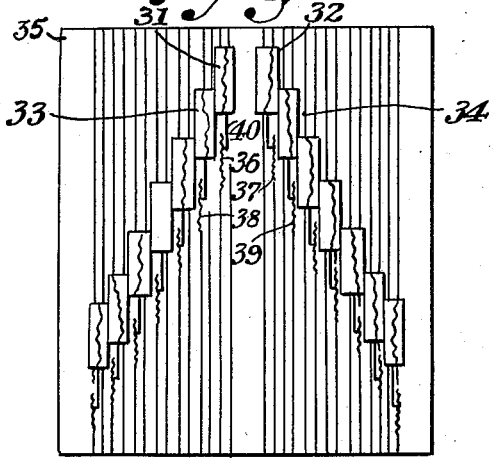
INVENTOR.
Pietro Cignolini,
BY
Wenderoth, Lind & Ponack
ATTYS.

United States Patent Office 2,842,671
Patented July 8, 1958

2,842,671

ROENTGENPOLYCHIMOGRAPHIC METHOD, APPARATUS THEREFOR AND ROENTGENPOLYKYMOGRAPH OBTAINABLE THEREBY

Pietro Cignolini, Genoa, Italy

Application December 28, 1953, Serial No. 400,608

Claims priority, application Italy January 2, 1953

7 Claims. (Cl. 250—65)

The present invention relates to a method and apparatus for obtaining a Roentgenpolykymograph.

It is known that it is the object of the Roentgenkymographic method to obtain on a film by the use of Roentgen rays a plurality of consecutive images of the profile of a moving organ of the human body, such as the heart.

In the earliest method a shield opaque to Roentgen rays and having a single slit extending transversely thereof was used. A photosensitive plate was placed behind the plate and moved across the slit. When the organ being considered was placed between a source of Roentgen rays and the opaque shield, there was obtained on the photosensitive plate a series of lines, the ends of which represented the outer extremity of the organ at the various instants of its pulsing. However, this method proved to be too restricted in the scope of the observation permitted.

There was further devised a shield having a plurality of parallel slits equidistantly spaced from each other, and a movement was imparted to the photosensitive film in a direction transverse to the slits and equal in distance to the spacing of the slits. When the organ to be studied was placed between a source of Roentgen rays and the shield, the kymograph obtained was a series of representations similar to those obtained by the earliest method, the number of points of the organ appearing on the film being equal to the number of slits in the shield. However, in this method, the running speed of the film and the distance through which it moves were limited so that the interpretation of the kymograph was correspondingly difficult. Such kymographs are known as "superficial kymographs."

A still further development was a method by which "analytic radiographs" are made possible. In this method a plurality of slits are used, but they are spaced from each other and are displaced in the direction of their length a distance such that the ends of the slits do not overlap. The slits are disposed along the profile of the organ to be considered and a kymograph made in the same manner as in the earlier methods. The movement of the film, however, is very rapid, thus giving a detailed analysis of the movement of a plurality of points of the profile of the organ. However, the length of the lines which are produced on the film is quite long, and there is thus no way to relate the lines to the mass morphology of the organ being considered.

The object of the present invention is to provide a method of making both a superficial kymograph and an analytical kymograph on the same film.

A further object of the invention is to provide an apparatus for carrying out the method of making both a superficial and an analytical kymograph on the same film.

The name which has been given to the kymograph produced by the method and the apparatus according to this invention is a Roentgenpolykymograph.

The method according to the present invention comprises the steps of exposing a rectangular area of a film which is sensitive to Roentgen rays to such Roentgen rays, by placing the organ of which the Roentgenpolykymograph is to be made between the source of the rays and the film and then passing the rays through a slit in a shield for the film. The slit in the shield is of a length such that it extends only a short distance over the profile edge of the organ. The film is moved rapidly beneath the slit and there is thus obtained an analytic kymograph. The area which will have been exposed will be rectangular. The rectangular area is then covered, and the remainder of the film is exposed by passing the Roentgen rays through a slit in another shield for the film which slit extends across substantially the entire width of the shield. The film is moved beneath this shield slowly, thus obtaining a superficial kymograph with an analytical kymograph associated therewith on the same film.

It is of course possible to provide a plurality of slits in the first shield, the slits being spaced from each other transverse to their length, and displaced relative to each other in the direction of their length with the centers of the slits offset a distance at least equal to their lengths so that their ends do not overlap. The film which is passed beneath such a shield will have thereon a plurality of analytical kymographs, one for each point of the profile of the organ over which one of the slits passes. The second shield likewise may have a plurality of parallel slits therein so that a superficial kymograph of a plurality of points along the profile of the organ is obtained on the same film as that on which the analytical kymographs of the same points have been produced.

A preferred embodiment of the apparatus for carrying out the above described method is shown by way of example in the accompanying drawings, in which:

Fig. 1 is a front elevation view of a first shield for the apparatus according to the invention;

Fig. 2 is a sectional elevation view taken along line II—II of Fig. 1;

Fig. 3 is a rear elevation view of the shield of Fig. 1;

Fig. 4 is a front elevation view of a second shield for the apparatus according to the invention;

Fig. 5 is a sectional elevation view along line V—V of Fig. 4;

Fig. 6 is a rear elevation view of the shield of Fig. 4;

Fig. 7 is an enlarged detail view of a shutter for the shield of Fig. 4; and

Fig. 8 is a diagram of a Roentgenpolykymograph obtained by using the apparatus of Figs. 1–7 according to the method of the invention.

The first shield, as shown in Figs. 1–3 consists of a frame 1 within which is supported a sheet of material 2 which is opaque to Roentgen rays. In the sheet 2 are two rows of a plurality of slits 3, 5, 7 . . . and 4, 6, 8 . . . which are parallel to each other, and the rows are separated by a middle portion 9 which has no slits therein. Slidably mounted in each of the slits are a plurality of shutters 11, 12, 13 . . . the number of shutters in each slit being such that there are spaces 15, 16, 17, 18 . . . equal to the length of one shutter left along the length of the slit so that the shutters can be shifted along the length of the slits in the directions of the arrows 14.

The second shield, as shown in Figs. 4–6, consists of a frame 21 of the same width as the frame 1 for the first shield but having a greater height. Stretched across the frame 21 in a direction perpendicular to the slits in the first shield are a plurality of pairs of fine wires 22. Slidably mounted on these pairs of wires 22 are a plurality of shutters 23, 24, 25, one mounted on each pair of wires, the width of these shutters being the same as the length of the uncovered spaces 15, 16, 17, 18 . . . in the first shield. The shutters 23, 24, 25 . . . are disposed with the centerlines offset a distance equal to the width of the shutters so that when placed side by side they completely cover an unbroken portion of the second shield. The length of the shutters is greater than their width.

As seen in Fig. 7, the shutters may each have a plurality of pegs 26 thereon aligned in two rows of three each. The wires 22 may then be passed in zig zag fashion through each row of pegs 26. This enables the shutters to be slid along the wires 22 in the directions of the arrows 27. Attached to each shutter is a stem 28 having a transversely projecting portion 29 on the free end thereof.

A third shield, not shown, is also necessary to the apparatus. This shield may be substantially identical to the first shield shown in Figs. 1-3, except that the shutters 11, 12, 13 . . . are not inserted in the slits 3, 5, 7 . . . and 4, 6, 8, . . . but the slits are left open. The middle portion may also be omitted, the slits in this case extending across the entire width of the shield.

To utilize the apparatus to practice the method, the shutters 11, 12, 13 . . . are positioned in the slits 3, 5, 7 . . . and 4, 6, 8 . . . so that the spaces 15, 16, 17, 18 . . . are disposed along the profile of the organ to be analized, the spaces crossing the profile. The ends of the spaces are positioned with the centers thereof offset a distance at least equal to their lengths so that they do not overlap. The organ to be analyzed is positioned between the first shield and a source of Roentgen rays and a film sensitive to Roentgen rays is positioned on the side of the first shield away from the organ being analyzed and is rapidly moved in a direction transverse to the direction of the slits 3, 5, 7 . . . 4, 6, 8 . . . through a distance substantially equal to the length of the shutters 23, 24, 25 . . . . The first shield is then taken away and the second shield placed in the position occupied by the first shield. The shutters 23, 24, 25 . . . are arranged so that they cover the portions of the film which have been exposed through the spaces 15, 16, 17, 18 . . . of the slits 3, 5, 7 . . . and 4, 6, 8 . . . as shown in Figs. 4 and 6. The third shield is then positioned over the second shield and the film again exposed to the Roentgen rays. The film is moved slowly through a distance substantially equal to the length of the shutters 23, 24, 25 . . . .

The resulting Roentgenpolykymograph is shown in Fig. 8. The analytical kymographs 31, 32, 33, 34 . . . are obtained by moving the film rapidly behind the first shield, and the superficial kymographs 37, 38, 39, 40 . . . are obtained by moving the film slowly behind the second and third shields. Thus there is obtained a kymograph on which there is an analytical kymograph and immediately adjacent thereto a superficial kymograph of the portion of the organ to which the analytical kymograph pertains. For example the analytic kymograph 31 relates to the same portion of the organ as does the superficial kymograph 36. Likewise the analytical kymograph 32 and the superficial kymograph 37 correspond. The image of the stem 28 and the transversely projecting portion 29 are shown at 40 and form an indicator of the superficial kymograph which corresponds to each analytical kymograph.

I claim:

1. A method of obtaining a Roentgenpolykymograph comprising exposing a rectangular area of a Roentgen-ray sensitive film to Roentgen-rays emanating from a source, between which source and said film is positioned a subject of which the Roentgenpolykymograph is being made, by passing said Roentgen-rays through a slit in a shield for said film, said slit being of a length to extend only a short distance over the profile edge of the subject, and moving the film beneath the slit rapidly to expose a rectangular area of the film, thus obtaining an analytical kymograph, covering said exposed rectangular areas, and exposing the remainder of said film by passing said Roentgen-rays through a slit in a shield for said film which slit extends along substantially the entire width of said shield, and moving the film beneath the slit slowly, thus obtaining a superficial kymograph with an associated analytical kymograph.

2. A method of obtaining a Roentgenpolykymograph of a pulsating subject comprising exposing a plurality of rectangular areas of a Roentgen-ray sensitive film to Roentgen-rays emanating from a source, between which source and said film is positioned the pulsating subject of which the Roentgenpolykymograph is being made, by passing said Roentgen-rays through a plurality of parallel slits in a shield for said film, said slits being of a length to extend only a short distance across the profile of said subject, said slits being disposed along the profile of said subject, the centers of said slits being offset from each other a distance equal to the length of a slit, and moving the film beneath the slit rapidly to expose a rectangular area of the film, thus obtaining a plurality of analytical kymographs on rectangular areas of the film along the profile of the subject, covering said exposed rectangular areas, and exposing the remainder of said film by passing said Roentgen-rays through a plurality of parallel slits in a shield for said film and moving said film beneath the slits slowly, thus obtaining a superficial kymograph with an analytical kymograph associated therewith.

3. A Roentgenpolykymograph of a pulsating subject comprising a plurality of rectangular areas having their longitudinal axes offset a distance equal to the width of said areas and disposed along the profile of said subject, each having therein an analytical kymograph of a point on the profile of said subject, and a plurality of superficial kymographs of the same points on the profile of said subject, the superficial kymographs from each point being positioned below the analytical kymograph for the corresponding point.

4. In an apparatus for obtaining a Roentgenpolykymograph of a pulsating subject, three frames, the first frame comprising a shield impervious to Roentgen-rays having a plurality of spaced parallel slits therein, and a plurality of shutters impervious to Roentgen-rays slidable in said slits and adapted to leave a portion of each of said slits unshielded, the second frame comprising a pair of members parallel to the slits in said first frame, a plurality of pairs of spaced parallel wires strung in a plane between said members, at least one pair for each of said slits in said first frame, and a plurality of rectangular shields, one slidable on each pair of wires, and of a width corresponding to the length of an unshielded portion in a slit in said first frame, the center lines of said rectangular shields being offset from each other a distance equal to the width of a rectangular shield, the shields being of a length greater than the width, and a third frame comprising a shield impervious to Roentgen-rays having a plurality of spaced parallel slits therein, said slits being spaced the same distance from each other as the slits in said first frame.

5. In an apparatus for obtaining a Roentgenpolykymograph of a pulsating subject, a first frame comprising a shield impervious to Roentgen-rays having a plurality of spaced parallel slits therein, and a plurality of shutters impervious to Roentgen-rays slidable in said slits to cover said slits, and adapted to leave a portion of each of said slits unshielded.

6. In an apparatus for obtaining a Roentgenpolykymograph of a pulsating subject, a second frame comprising a pair of members parallel to each other, a plurality of pairs of spaced parallel wires strung in a plane between said parallel members, and a plurality of rectangular shields, one slidable on each pair of wires and having their center lines offset from each other a distance equal to the width thereof, and being of a length greater than the width.

7. In an apparatus for obtaining a Roentgenpolykymograph of a pulsating subject, a second frame as claimed in claim 4 in which each of said rectangular shields has two rows of spaced pegs aligned in the direction of said wires, said wires being passed alternately to one side and then to the other side of said aligned pegs, whereby said rectangular shields can be moved along and positioned on said wire.

References Cited in the file of this patent

UNITED STATES PATENTS

| | | |
|---|---|---|
| 1,704,974 | Katzman | Mar. 12, 1929 |
| 2,258,593 | Black | Oct. 14, 1941 |
| 2,511,097 | Bonnet | June 13, 1950 |